United States Patent [19]
Fujii et al.

[11] Patent Number: 5,237,562
[45] Date of Patent: Aug. 17, 1993

[54] ECHO PATH TRANSITION DETECTION

[75] Inventors: Kensaku Fujii, Yamato; Juro Ohga, Kamakura; Hiroyuki Masuda, Sano; Yoshihiro Sakai, Yokohama, all of Japan

[73] Assignee: Fujitsu Limited, Kawasaki

[21] Appl. No.: 667,663

[22] Filed: Mar. 11, 1991

[30] Foreign Application Priority Data

Mar. 14, 1990 [JP] Japan .................................. 2-063133

[51] Int. Cl.$^5$ .......................... H04J 3/00; H04M 9/00
[52] U.S. Cl. .................................. 370/32.1; 379/406; 379/410; 379/411
[58] Field of Search .................. 370/32, 32.1; 379/406, 379/410, 411

[56] References Cited

U.S. PATENT DOCUMENTS

| | | | |
|---|---|---|---|
| 3,821,493 | 6/1974 | Chiba | 370/32.1 |
| 4,562,312 | 12/1985 | Duttweiler | 370/32.1 |
| 4,571,465 | 2/1986 | Brie et al. | 370/32.1 |
| 4,633,046 | 12/1986 | Kitayama et al. | 370/32.1 |
| 5,042,026 | 8/1991 | Koike et al. | 370/32.1 |

FOREIGN PATENT DOCUMENTS 60-125025 7/1985 Japan .
61-056526 3/1986 Japan .
64-029027 1/1989 Japan .

*Primary Examiner*—Curtis Kuntz
*Assistant Examiner*—Vijay Shankar
*Attorney, Agent, or Firm*—Staas & Halsey

[57] ABSTRACT

A method for detecting a transition of an echo path used for an estimation of the transfer function of a system by using an adaptive filter, from an echo caused by a signal transmitted through an input terminal of the system at which the response of the transmitted signal is received. The method includes the steps of calculating the amount of the whole or the first delay portion of an impulse response of the system, calculating the amount of the remaining delay portion of the impulse response of the system, calculating the ratio between the amount of the whole or the first delay portion of the impulse response and the amount of the remaining delay portion of the impulse response, and deciding an occurrence of a transition of the characteristics of the system based on the calculated ratio. The transition of the characteristics of the system is discriminated from a hindering signal produced in the system in the decision making process.

10 Claims, 20 Drawing Sheets

$S_j$ : SPEECH VOICE $N_j$ : ENVIRONMENTAL NOISE $Y_j$ : INPUT SIGNAL $\Sigma H_j(i)X_j(i)$ : ECHO REPLICA $E_j$ : RESIDUAL ECHO $H_j(i)$ : FILTER COEFFICIENT $X_j$ : OUTPUT SIGNAL

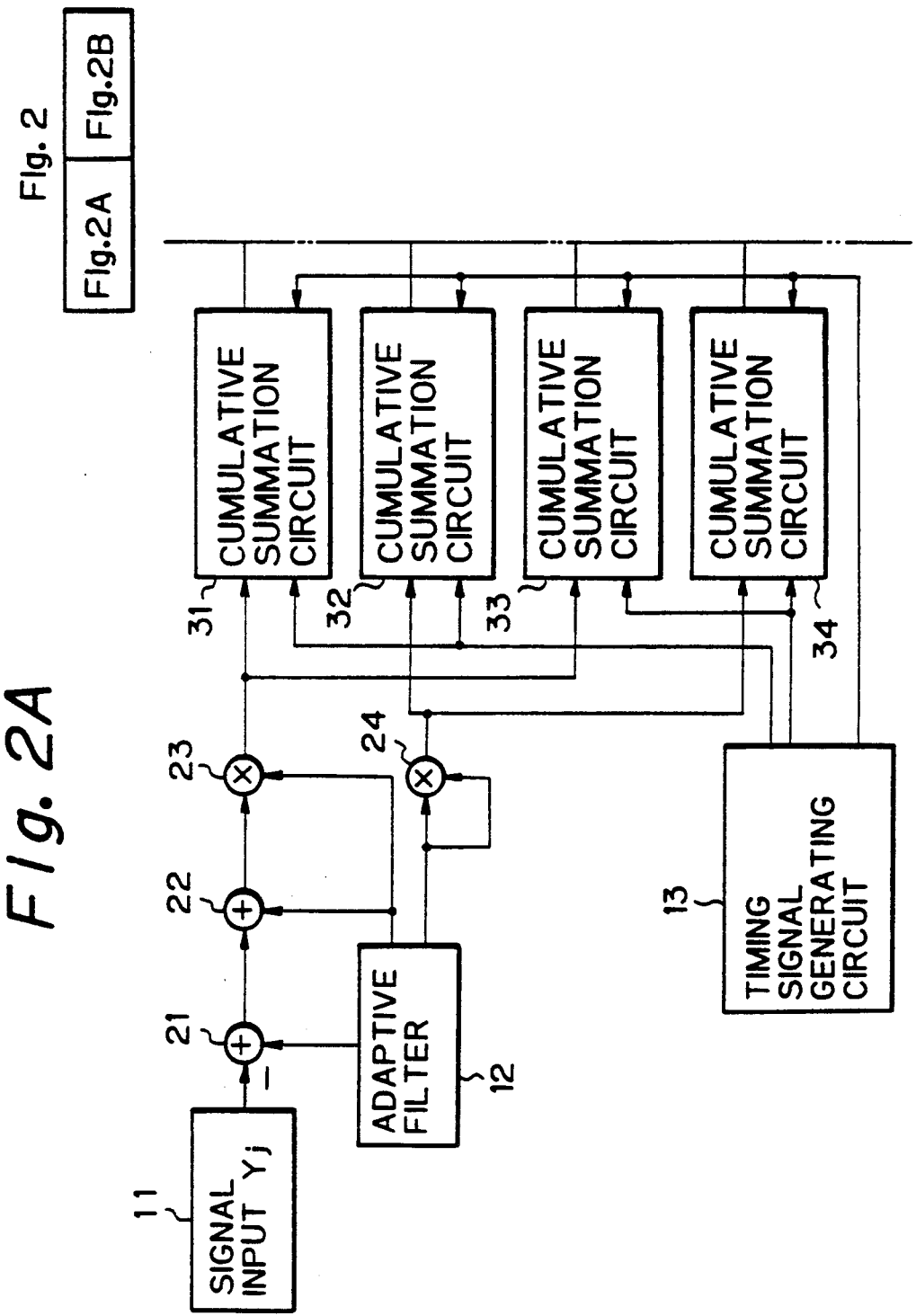

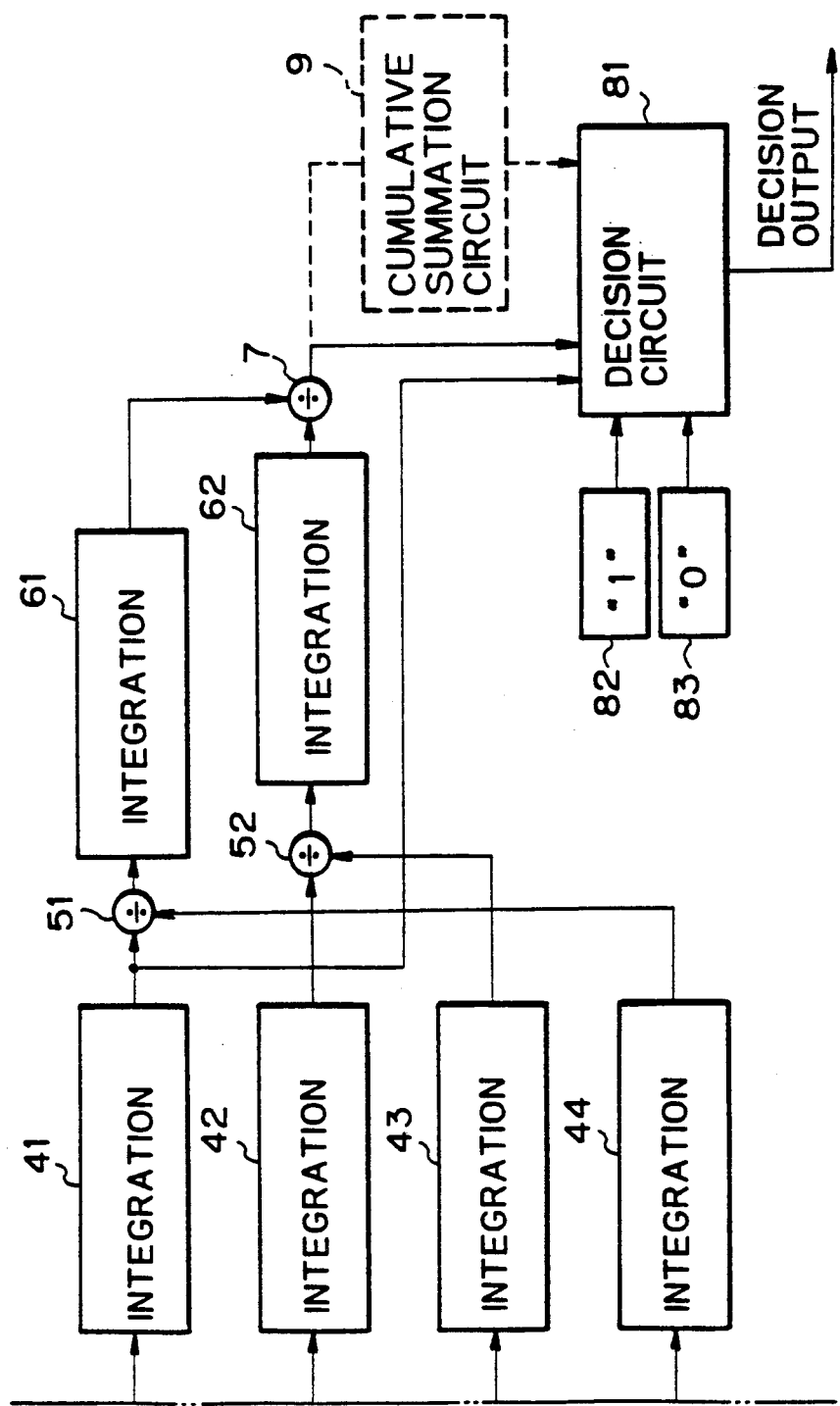

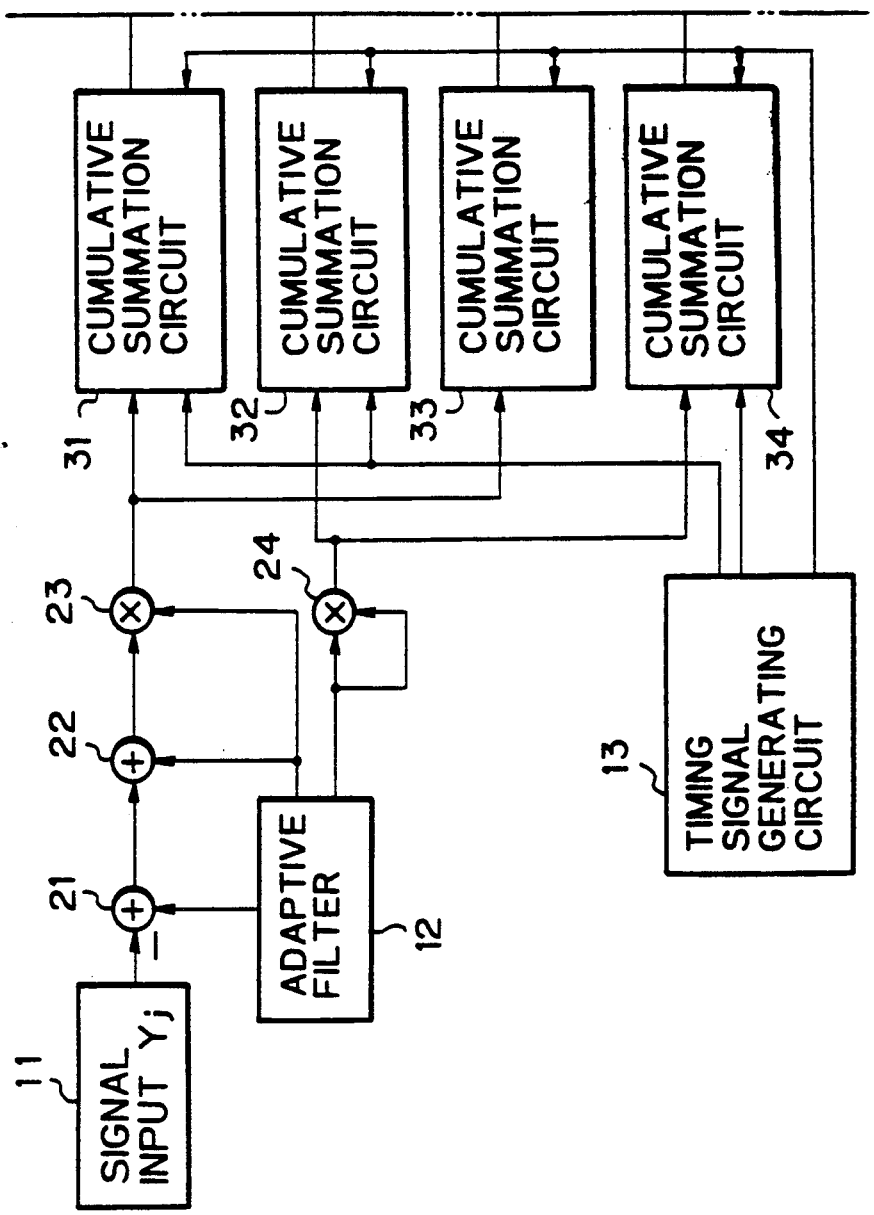

ECHO PATH TRANSITION DETECTION

BACKGROUND OF THE INVENTION

1. Field of the Invention

The present invention relates to a method and an apparatus for detecting a transition of an echo path. The apparatus according to the present invention is applicable, for example, to a hands-free telephone with echo canceller used for a television conference system, a signal transmission used for satellite communication, and the like.

2. Description of the Related Art

In acoustic and electric communication systems, an echo canceller having an adaptive filter is used for cancelling an echo caused by a sending-out of a signal. In such an echo canceller, an echo replica, which is equivalent to the echo which is a part of the signal sent out from an output terminal and returned by reflection to an input terminal, is synthesized. For this synthesis, a system transfer function which is an echo path gain of the system is estimated, and an adaptive filter having a transfer function which is equivalent to the above-mentioned system transfer function is constituted. To estimate the coefficient of such an adaptive filter, a response of the system obtained at the input terminal is used.

In the estimation of the adaptive filter coefficient for the adaptive filter, the precision of the estimation will deteriorate when double talk caused by a signal which is independently generated in the system occurs, as well as when a variation of the transfer function of the system occurs. In the former case where the double talk occurs, the estimation operation should be temporarily halted, while in the latter case where the transfer function variation occurs, the actual estimation operation should be maintained. Therefore, the establishment of a method for discriminating between these two cases has been needed.

Prior art approaches for handling such a method are proposed, for example, in Japanese Unexamined Patent Publication (Kokai) Nos. 60-125025, 61-56526, and 64-29027, but these do not provide a fully satisfactory solution.

SUMMARY OF THE INVENTION

It is an object of the invention to provide an improved method and apparatus for detecting a transition of an echo path in which the transition of an echo path is clearly discriminated from double talk, an occurrence of a transition of an echo path is quickly detected, and accordingly the possibility of howling is minimized.

In accordance with an aspect of the present invention, there is provided a method for detecting a transition of an echo path used for an estimation of the transfer function of a system by using an adaptive filter, from an echo caused by a signal transmitted through an input terminal of the system at which the response of the transmitted signal is received, the method including the steps of: calculating the amount of the whole or a first delay portion of an impulse response of the system, calculating the amount of a remaining delay portion of the impulse response of the system, calculating the ratio between the amount of the whole or the first delay portion of the impulse response and the amount of the remaining delay portion of the impulse response, and deciding an occurrence of a transition of the characteristic of the system based on the calculated ratio, the transition of the characteristic of the system being discriminated from a hindering signal produced in the system in the decision making process.

In accordance with another aspect of the present invention, there is provided an apparatus for detecting a transition of an echo path used for an estimation of the transfer function of a system by using an adaptive filter, from an echo caused by a signal transmitted through an input terminal of the system at which the response of the transmitted signal is received, the apparatus including: a first calculation unit for calculating the amount of the whole or a first delay portion of the impulse response of the system, a second calculation unit for calculating the amount of a remaining delay portion of the impulse response of the system, a ratio calculation unit for calculating the ratio between the amount of the whole or the first delay portion of the impulse response of the system and the amount of the remaining delay portion of the impulse response of the system, and a decision unit for deciding an occurrence of a transition of the characteristic of the system based on the ratio calculated by the ratio calculation unit, the transition of the characteristic of the system being discriminated from a hindering signal produced in the system in the decision making process of the decision unit.

BRIEF DESCRIPTION OF THE DRAWINGS

FIGS. 2, 2A and 2B are a schematic block diagrams of an apparatus for detecting a transition of an echo path according to an embodiment of the present invention;

FIGS. 16, 16A and 16B are a schematic block diagrams of an apparatus for detecting a transition of an echo path according to another embodiment of the present invention;

DESCRIPTION OF THE PREFERRED EMBODIMENTS

Figure 1:
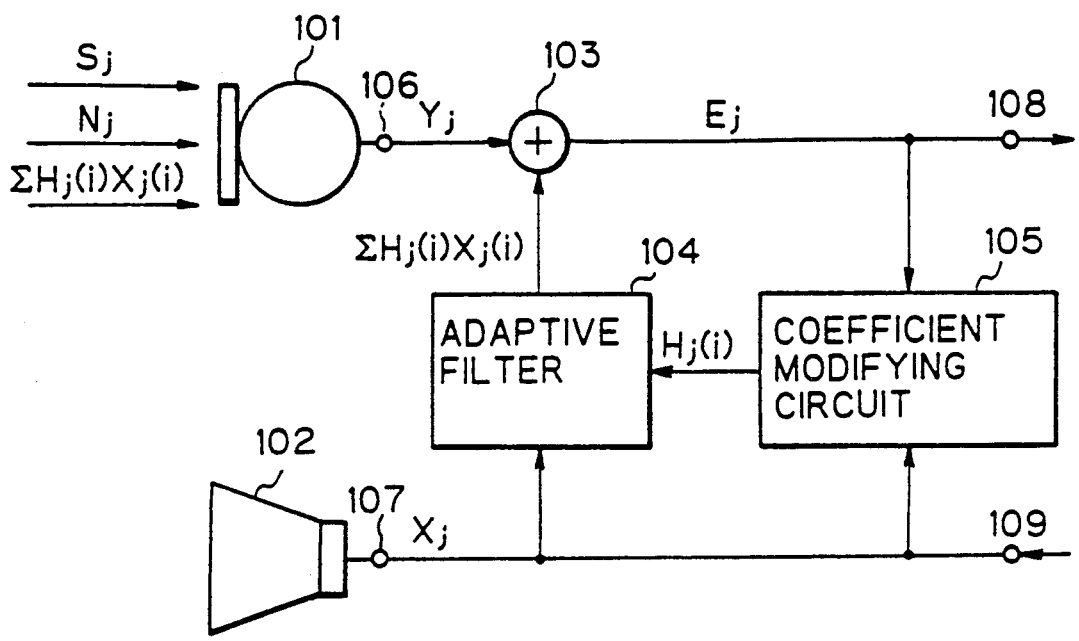
FIG. 1 shows the arrangement of a prior art echo canceller.

Before describing the preferred embodiments, a prior art echo canceller will be explained with reference to FIG. 1. The echo canceller of FIG. 1 is constituted by a residual echo calculator 103, an adaptive filter 104 having a plurality of taps m where m=1,2, ... I, and a coefficient modifying circuit 105. A microphone 101 is connected to an input terminal 106 to output a signal and a speaker 102 is connected to an output terminal 107 to receive a signal. The system between the speaker 102 and the microphone 101 is the system in question.

In the residual echo calculator 103, an input signal $Y_j$ from the input terminal 106 and an echo replica $\Sigma H_j(i)X_j(i)$ are received and a residual echo $E_j$ is calculated. The suffix j indicates the order number in iteration. In the adaptive filter 104, an output signal $X_j$, i.e., the signal of a received voice which is applied to the output terminal 107, and a filter coefficient $H_j(i)$ from the coefficient modifying circuit 105 are received and a echo replica $\Sigma H_j(i)X_j(i)$ is produced. In the coefficient modifying circuit 105, an output signal $X_j$, i.e., the signal of a received voice which is applied to the output terminal 107, and a residual echo $E_j$ from the residual echo calculator 103 are received and a filter coefficient $H_j(i)$ is produced. In FIG. 1, the transmitted voice is represented by $S_j$, the environmental noise is represented by $N_j$, and the echo is represented by $\Sigma h_j(i)X_j(i)$.

In the echo canceller of FIG. 1, the double talk is detected from the change of the level of the microphone output signal $Y_j$. Since the microphone output signal is represented by the equation where $\Sigma$ represents the cumulative summation i=1,2, ... I:

$$Y_j = (S_j + N_j) + \Sigma h_j(i)X_j(i) \qquad (1)$$

where the double talk is given as the rise of the level of the microphone output signal $Y_j$ due to "the summation of the transmitted voices $S_j$".

In practice, the echo $\Sigma h_j(i)X_j(i)$ derived from the speaker output signal $X_j$ is in many cases greater than the transmitted voice $S_j$, and the above-mentioned double talk can be detected only if the transmitted voice is very powerful. Such a situation causes a delay in the detection of the double talk, and increases the disturbance in the estimation of the coefficient.

Such a delay in the detection is reduced by simultaneously using the detection of the variation of the level of the residual echo $E_j$. The estimation error $\Delta_j(i)$ is included in the equation of the residual echo $E_j$:

$$\begin{aligned} E_j &= Y_j - \Sigma H_j(i)X_j(i) \\ &= (S_j + N_j) + \Sigma h_j(i)X_j(i) - \Sigma H_j(i)X_j(i) \\ &= (S_j + N_j) + \Sigma \Delta_j(i)X_j(i) \end{aligned} \qquad (2)$$

In the convergence of the operation of the echo canceller, the estimated error $\Delta_j(i)$ included in the residual echo in the above-indicated equation is approximately equal to zero:

$$\Sigma \Delta_j(i)X_j(i) \approx 0 \qquad (3)$$

Accordingly, the double talk can be detected by only a slight summation of the transmitted voices $S_j$. Thus, the delay in the detection of the double talk is extensively reduced by the simultaneous use of the detection of the variation of the level of the residual echo $E_j$.

Various methods have been proposed to ensure the discrimination between the variation in the system transfer function and the double talk, such as shown in Japanese Unexamined Patent Publication (Kokai) Nos. 60-125025, 61-56526, and 64-29027. However, no satisfactory solutions have yet been established.

The schematic block diagram of an apparatus for detecting a transition of an echo path according to an embodiment of the present invention is shown in FIG. 2. The apparatus of FIG. 2 includes a signal ($Y_j$) input portion 11, an adaptive filter 12, a timing signal generating circuit 13, adders 21, 22, multipliers 23, 24, cumulative summation circuits 31, 32, 33, 34, integration portions 41, 42, 43, 44, dividers 51, 52, integration portions 61, 62, a divider 7, a decision circuit 81, and reference signal inputs 82, 83. The microphone output signal $Y_j$ is delivered from the signal input 11. The adaptive filer 12, which has a plurality of taps m, where m=1,2, ... I, receives the output signal $X_j$ as the received voice and the filter coefficient $H_j(i)$ from the coefficient modifying circuit, produces the echo replica $\Sigma H_j(i)X_j(i)$, and is able to deliver tap-m components $H_j(m)X_j(m)$ and $X_j(m)$ of the echo replica and the output signal.

In the adder 21, the difference between the microphone output signal $Y_j$ and an output $\Sigma H_j(i)X_j(i)$ of the adaptive filter, i.e., the residual echo $E_j$, is produced. In the adder 22, the sum of the residual echo $E_j$ from the adder 21 and the tap-m component $H_j(m)X_j(m)$ from the adaptive filter 12 is produced. In the multiplier 23, the product of the output "$E_j + H_j(m)X_j(m)$" from the adder 22 and the tap-m component $H_j(m)X_j(m)$ from the adaptive filter 12 is produced. In the multiplier 24, the square of the tap-m component $X_j(m)$ from the adaptive filter 12 is produced. The timing signal from the timing signal generating circuit 13 is supplied to the cumulative summation circuits 31, 32, 33, and 34.

In the cumulative summation circuit 31, the cumulative summation with regard to m=257 to 512 of the output $R_j(m)$ of the multiplier 23 is carried out to produce $\Sigma_{(257\ to\ 512)}R_j(m)$. In the cumulative summation circuit 32, the cumulative summation with regard to m=257 to 512 of the output $X_j^2(m)$ of the multiplier 24 is carried out to produce $\Sigma_{(257\ to\ 512)}X_j^2(m)$. In the cumulative summation circuit 33, the cumulative summation with regard to m=1 to 256 of the output $R_j(m)$ of the multiplier 23 is carried out to produce $\Sigma_{(1\ to\ 256)}R_j(m)$. In the cumulative summation circuit 34, the cumulative summation with regard to m=1 to 256 of the output $X_j^2(m)$ of the multiplier 24 is carried out to produce $\Sigma_{(1\ to\ 256)}X_j^2(m)$.

In each of the integration portions 41, 42, 43, and 44, each of the outputs of the cumulative summation circuits 31, 32, 33, and 34 is integrated with regard to the iteration. In the divider 51, the quotient $\Sigma_{(257\ to\ 512)}R_j(m)/\Sigma_{(1\ to\ 256)}X_j^2(m)$ between the outputs of the integration portions 41 and 44 is produced. In the divider 52, the quotient $\Sigma_{(1\ to\ 256)}R_j(m)/\Sigma_{(257\ to\ 512)}X_j^2(m)$ between the outputs of the integration portions 42 and 43 is produced.

In each of the integration portions 61 and 62, each of the outputs of the dividers 51 and 52 is integrated with regard to the interaction. In the divider 7, the quotient $$\frac{\Sigma_{(257\ to\ 512)}R_j(m)/\Sigma_{(1\ to\ 256)}X_j^2(m)}{\Sigma_{(1\ to\ 256)}R_j(m)/\Sigma_{(257\ to\ 512)}X_j^2(m)}$$

between the outputs of the integration portions 61 and 62 is produced to provide the value $\Sigma(n)Q_j$.

In the decision circuit 81, the transition of an echo path is decided if the output $\Sigma(n)Q_j$ of the divider 7 is equal to or more than 1 and the output of the integration portion 41 is equal to or less than 0, so that the result of this decision is delivered as the decision output from the decision circuit 81.

The principle of the operation of the apparatus of FIG. 2 will be described below.

The difference $E_j(m)$ between the microphone output signal $Y_j$ and the echo replica $\Sigma_{(exclude\ m)}H_j(i)X_j(i)$ synthesized by excluding filter taps m where m=1 to I is considered.

$$\begin{aligned}
E_j(m) &= \Sigma_{(exclude\ m)}H_j(i)X_j(i) & (4) \\
&= S_j + N_j + \Sigma h_j(i)X_j(i) - \Sigma_{(exclude\ m)}H_j(i)X_j(i) & (5) \\
&= h_j(m)X_j(m) + S_j + N_j + \Sigma_{(exclude\ m)}h_j(i)X_j(i) \\
&\quad - \Sigma_{(exclude\ m)}H_j(i)X_j(i) & (6) \\
&= h_j(m)X_j(m) + S_j + N_j + \Sigma_{(exclude\ m)}\Delta_j(i)X_j(i) & (7)
\end{aligned}$$

Thus, the difference $E_j(m)$ is constituted by the term $h_j(m)X_j(m)$ containing the echo path gain $h_j(m)$ corresponding to tap m of the adaptive filter and the disturbance $S_j+N_j+\Sigma_{(exclude\ m)}\Delta_j(i)X_j(i)$. This difference approaches asymptotically as the estimation operation proceeds with time to a target value $E_{aj}(m)$ indicated below.

$$E_{aj}(m) = h_j(m)X_j(m) + S_j + N_j \qquad (8)$$

Figure 3:
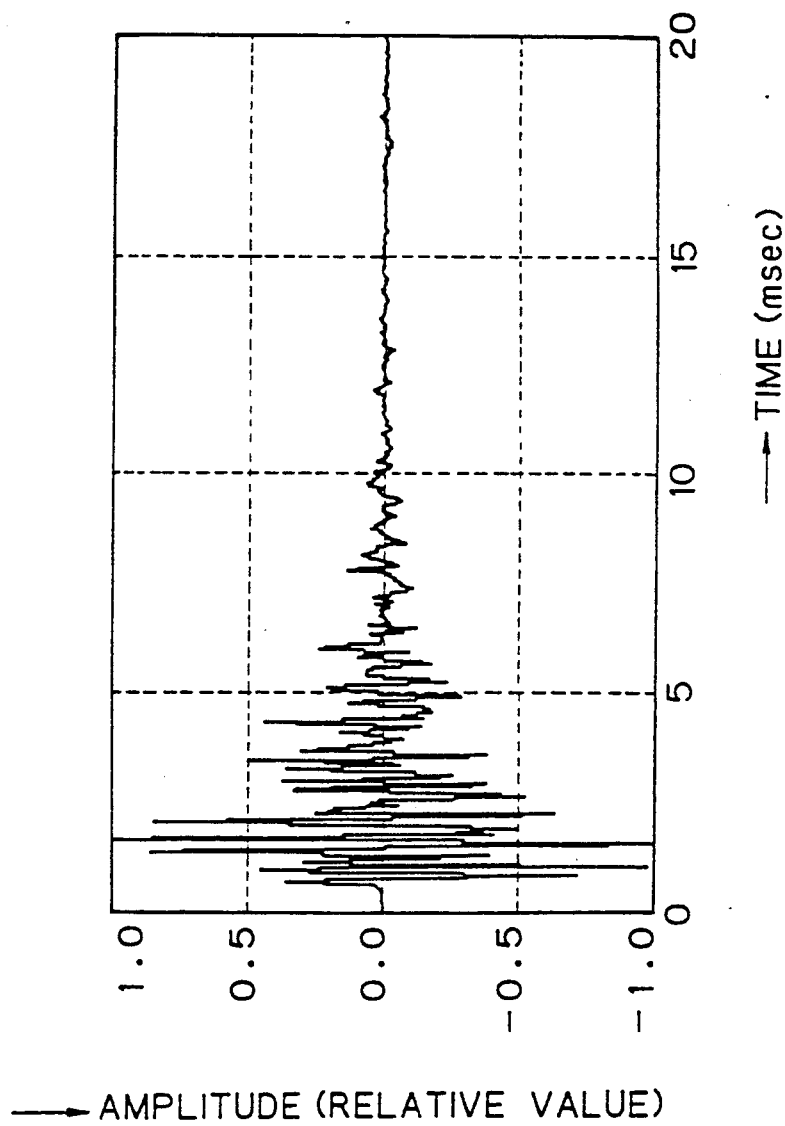
FIG. 3 shows the characteristics of an acoustic coupling between a microphone and speaker of a hands-free telephone.

The echo path gain $h_j(m)$ which is the impulse response of the system reveals the attenuation characteristic shown in FIG. 3. In the beginning period of the estimation of the echo path gain $h_j(m)$ according to the above-mentioned equation (7), there is a great deal of error in the estimated value, and the form of the echo path gain derived from the estimated value does not reveal the attenuation characteristics. The attenuation characteristics are considered to be gradually revealed as the estimation operation proceeds.

This shows the fact that, if the estimated shape of the echo path gain reveals the attenuation characteristic, the estimation of the echo path gain can be decided to be in a steady state period after the completion of the estimation, while, if a disturbance is observed in the estimated shape of the echo path gain, the estimation of the echo path gain can be decided to be in a transient period.

The terms "$S_j+N_j$" of the transmitted voice and the environmental noise in the right side of the above-mentioned equation (8) naturally hinder the decision of the estimation. A way to find the attenuation characteristics given by the echo path gain with the suppression of this hindrance will be described below.

First, the difference $E_j(m)$ is multiplied by $H_j(m)X_j(m)$.

$$\begin{aligned}
R_j(m) &= E_j(m)H_j(m)X_j(m) & (9) \\
&= h_j(m)H_j(m)X_j^2(m) + \\
&\quad \{S_j + N_j + \Sigma_{(exclude\ m)}\Delta_j(i)X_j(i)\}H_j(m)X_j(m)
\end{aligned}$$

This $R_j(m)$ approaches asymptotically to the value $R_{aj}(m)$ indicated below.

$$R_{aj}(m) = h_j^2(m)X_j^2(m) + (S_j+N_j)h_j(m)X_j(m) \qquad (10)$$

The cumulative sum of the $R_{aj}(m)$ with respect to m=1 to M is calculated and the calculated cumulative sum is normalized with respect to the power $\Sigma_{(1\ to\ M)}X_j^2(m)$ as follows.

$$\begin{aligned}
P_a &= \Sigma_{(1\ to\ M)}R_{aj}(m)/\Sigma_{(1\ to\ M)}X_j^2(m) & (11) \\
&= \Sigma_{(1\ to\ M)}h_j^2(m) + \\
&\quad \Sigma_{(1\ to\ M)}(S_j+N_j)h_j(m)X_j(m)/\Sigma_{(1\ to\ M)}X_j^2(m)
\end{aligned}$$

Thus, the speaker output signal $X_j$ is eliminated in the first term of the right side of the above-indicated equation (10). The equation (11) gives the power of the first delay part of the echo path gain.

Similarly, the power $P_b$ of the latter delay part of the echo path gain is derived by cumulatively summing the $R_{aj}(m)$ with respect to m=(M+1) to I.

Therefore, the ratio of the above-mentioned powers after the convergence of the estimation of the coefficient based on the attenuation characteristic of the echo path gain is assumed to be a ratio Q as follows.

$$Q = \frac{P_b}{P_a} < 1 \qquad (12)$$

The second term of the right side of the above-indicated equation (11) is very small, and therefore the influence of the second term on the above-mentioned decision is considered to be negligible.

It is possible to detect the variation of the characteristic of the system with a discrimination between the disturbance signal in the system and a variation in the system characteristics by using the integrated value of the power ratio. In this case, the influence of the application of the transmitted voice is reduced. The term $Q_{nj}$ is calculated as follows where $\Sigma_n$ represents the integration with respect to j to (j+n-1).

$$Q_{nj} = \Sigma_n Q_j \qquad (13)$$

It is also possible to decide the occurrence of the variation of the characteristics of the system if the amount of the whole or the first delay part of the impulse response of the system is 0 or negative.

It is also possible to detect the variation of the characteristics of the system with a discrimination between the disturbance signal in the system and the system characteristics variation by using a simplified calculation in which the normalization calculation by the power is simplified. In this case, the power ratio is calculated by the approximation calculation as follows.

$$Q_{nj} = \Sigma_n Q_j \qquad (14)$$
$$= \Sigma_n\{\Sigma_{(257\ to\ 512)}R_j(m)/\Sigma_{(257\ to\ 512)}X_j^2(m)\}/$$
$$\Sigma_n \times \{\Sigma_{(1\ to\ 256)}R_j(m)/\Sigma_{(1\ to\ 256)}X_j^2(m)\}$$
$$\approx \{\Sigma_n\Sigma_{(257\ to\ 512)}R_j(m)/\Sigma_n\Sigma_{(257\ to\ 512)}X_j^2(m)\}/$$
$$\{\Sigma_n\Sigma_{(1\ to\ 256)}R_j(m)/\Sigma_n\Sigma_{(1\ to\ 256)}X_j^2(m)\}$$
$$\approx \{\Sigma_n\Sigma_{(257\ to\ 512)}R_j(m)/\Sigma_n\Sigma_{(1\ to\ 256)}X_j^2(m)\}/$$
$$\{\Sigma_n\Sigma_{(257\ to\ 512)}R_j(m)/\Sigma_n\Sigma_{(1\ to\ 256)}X_j^2(m)\}$$

The characteristics of the acoustic coupling between the microphone and the speaker of a hands free telephone are shown in FIG. 3. The damping characteristic of the echo path gain $h_j(m)$ as the impulse response of the system is shown in FIG. 3, where the abscissa represents the time in msec and the ordinate represents the amplitude in the relative value as the normalized value with regard to the maximum amplitude.

By using the technique of the apparatus of FIG. 2, it is possible to carry out a control to make the coefficient correction constant K, i.e., a step gain, after the convergence in the learning identification method, i.e., the normalized least mean square method, less than the value for the transient period of the convergence. The learning identification method is expressed by the following equation.

$$H_{j+1}(m) = H_j(m) + KE_jX_j(m)/\Sigma H_j(i)X_j(i) \qquad (15)$$

With regard to equation (9) for $R_j(m)$, the following calculation is carried out.

$$\Sigma_{(1\ to\ 256)}R_j(m) = \Sigma_{(1\ to\ 256)}\Sigma_j(m)H_j(m)H_j(m) \qquad (16)$$
$$= \Sigma_{(1\ to\ 256)}\{Y_j - \Sigma_{(exclude\ m)}H_j(i)X_j(i)\}H_j(m)X_j(m)$$
$$= Y_j\Sigma_{(1\ to\ 256)}H_j(m)X_j(m) - \Sigma_{(1\ to\ 256)}\{H_j(m)X_j(m)\Sigma_{(exclude\ m)}H_j(i)X_j(i)\}$$

The pseudo echo by the synthesis with respect to $m = 1$ to $M$ is presumed as follows.

$$Pl_j = \Sigma_{(1\ to\ 256)}H_j(m)X_j(m) \qquad (17)$$

Then, it is possible to calculate the $\Sigma_{(1\ to\ 256)}R_j(m)$ as follows.

$$\Sigma_{(1\ to\ 256)}R_j(m) = Y_jPl_j - \qquad (18)$$
$$\Sigma_{(1\ to\ 256)}\{H_j(m)X_j(m)\Sigma_{(exclude\ m)}H_j(i)X_j(i)\}$$
$$= Y_jPl_j - \Sigma_{(1\ to\ 256)}H_j(m)X_j(m)\{Pl_j - H_j(m)X_j(m)\}$$
$$= (Y_j - Pl_j)Pl_j + \Sigma_{(1\ to\ 256)}H_j^2(m)X_j^2(m)$$

With regard to the equation for $\Sigma_{(1\ to\ 256)}R_j(m)$, it is possible to find the characteristics of the echo path after the convergence to be of the attenuation function nature, and the following equation may be derived.

$$\Sigma_{(1\ to\ 256)}R_j(m) = E_jPl_j + \Sigma_{(1\ to\ 256)}H_j^2(m)X_j^2(m) \qquad (19)$$

The characteristics obtained by the inventors from the operation of an example of the apparatus of FIG. 2 will be explained with reference to FIGS. 4 to 13.

Figure 4:
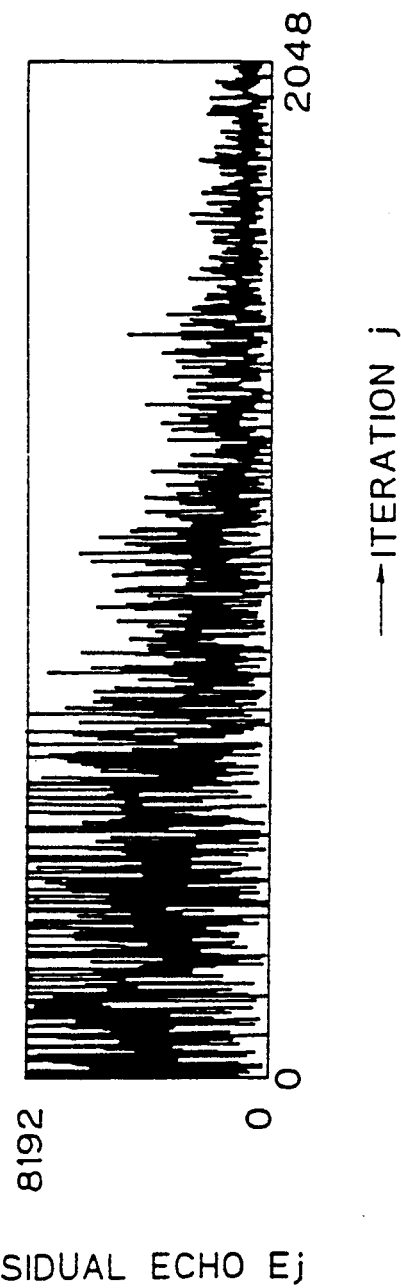
FIG. 4 shows the characteristics of a residual echo.

Characteristics of the residual echo are shown in FIG. 4. The characteristic of the convergence of the residual echo $E_j$ with 512 sample points of the reverberation time is shown in FIG. 4, where the abscissa represents the time in msec and the ordinate represents the amplitude in the relative value.

Figure 5:
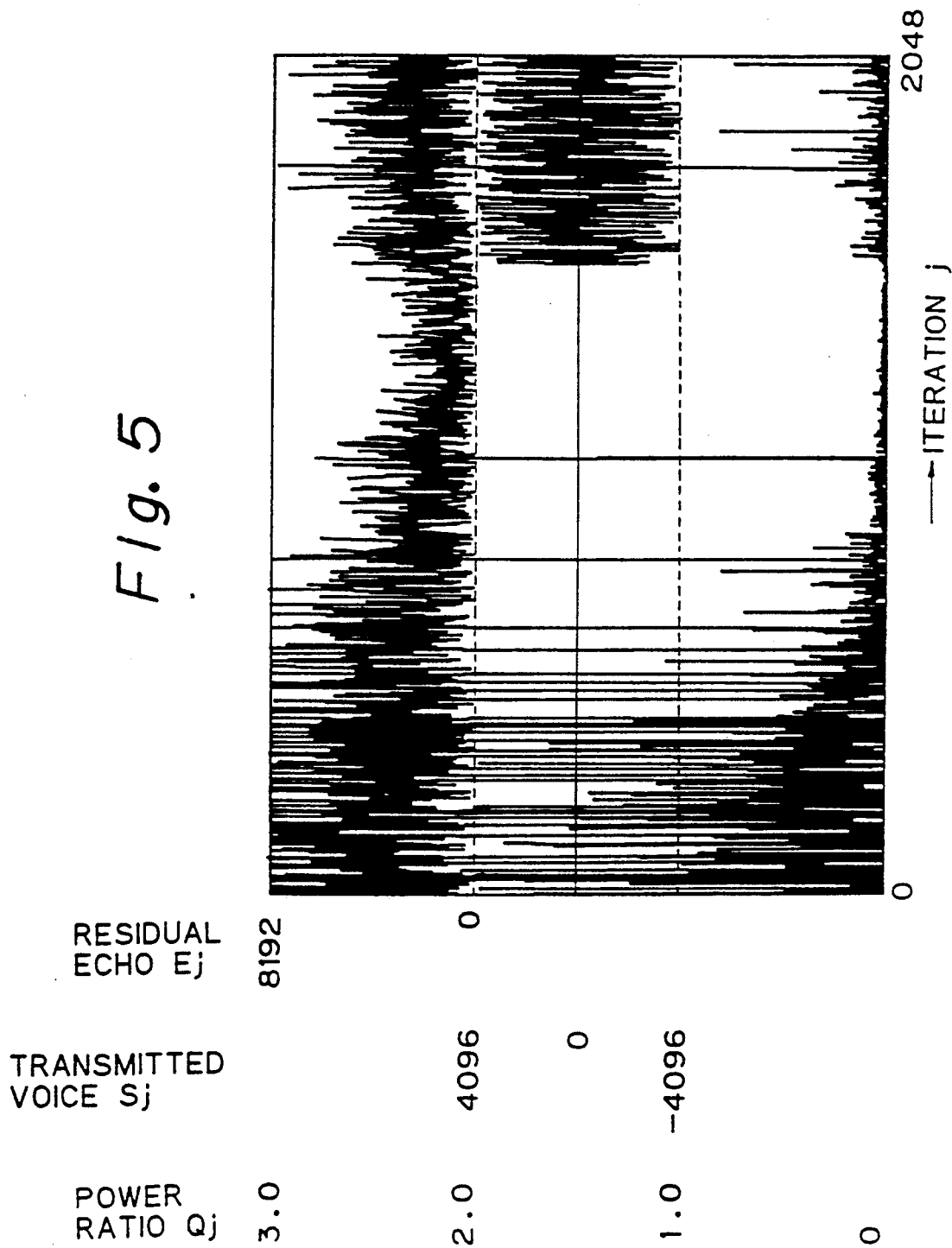
FIG. 5 shows the characteristics of the relationship between double talk and power ratio.

Characteristics of the relationship between the double talk and the power ratio are shown in FIG. 5. The changes of the residual echo $E_j$ and the power ratio $Q_j$ in the case where the maximum amplitude of the transmitted voice is as great as $\pm 4096$ are shown in FIG. 5, where the abscissa represents the iteration j and the ordinate represents the residual echo $E_j$, the transmitted voice $S_j$, or the power ratio $Q_j$.

In the apparatus of FIG. 2, if the integrations, with regard to time, of the data by the integration portions are not carried out, the transmitted voice $S_j$ component may not be fully suppressed, and the discrimination between the double talk and the echo path transition may not be completely attained. To ensure the complete discrimination between the double talk and the echo path transition for an extensive system, it is preferable to use the integration portions for integrating the data with regard to time.

Figure 6:
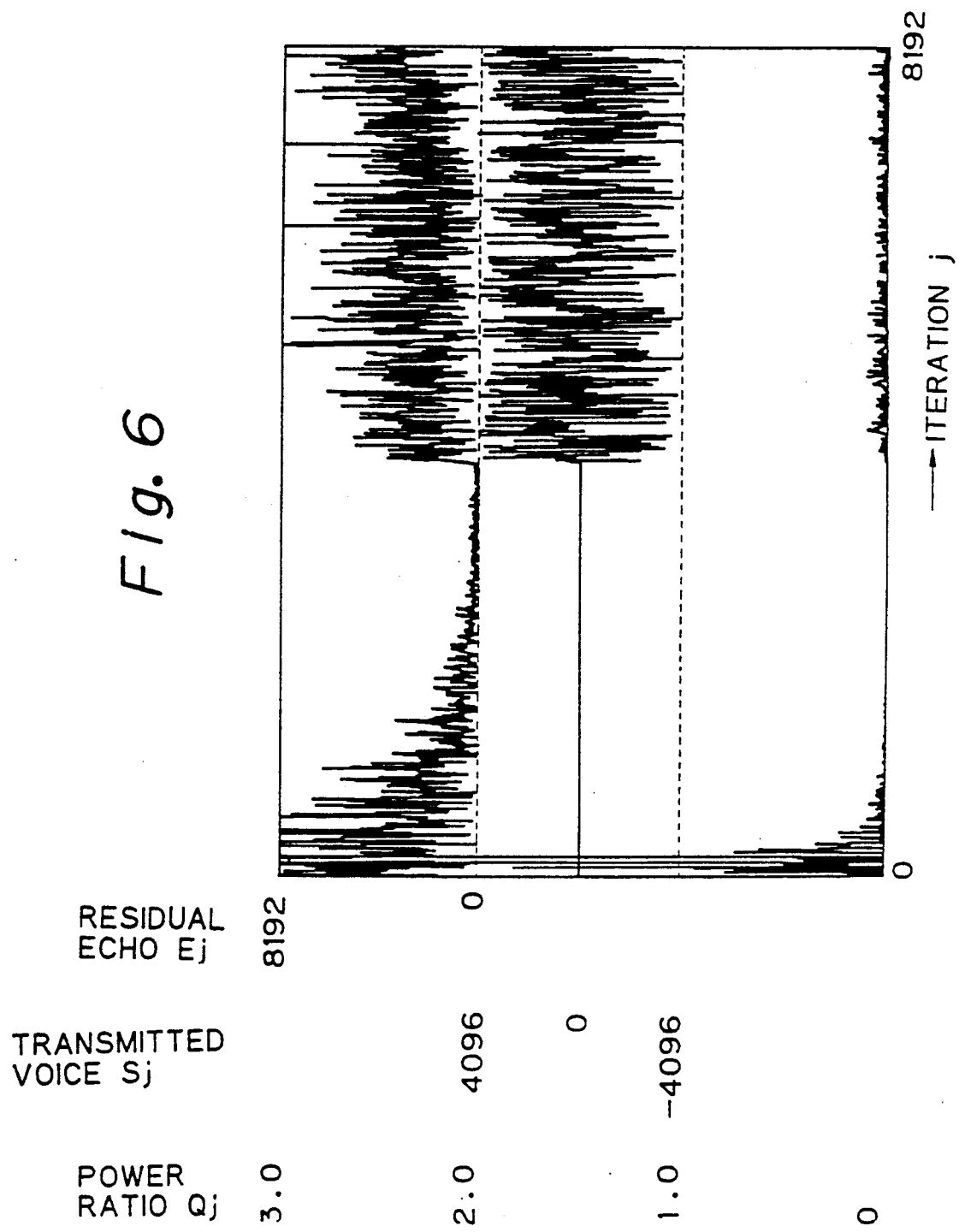
FIG. 6 shows the characteristics of the double talk by use of data integrated with respect to time.

Characteristics of the double talk by use of the data integrated with respect to time, in the case where the number of integrations is 8 are shown in FIG. 6.

Figure 7:
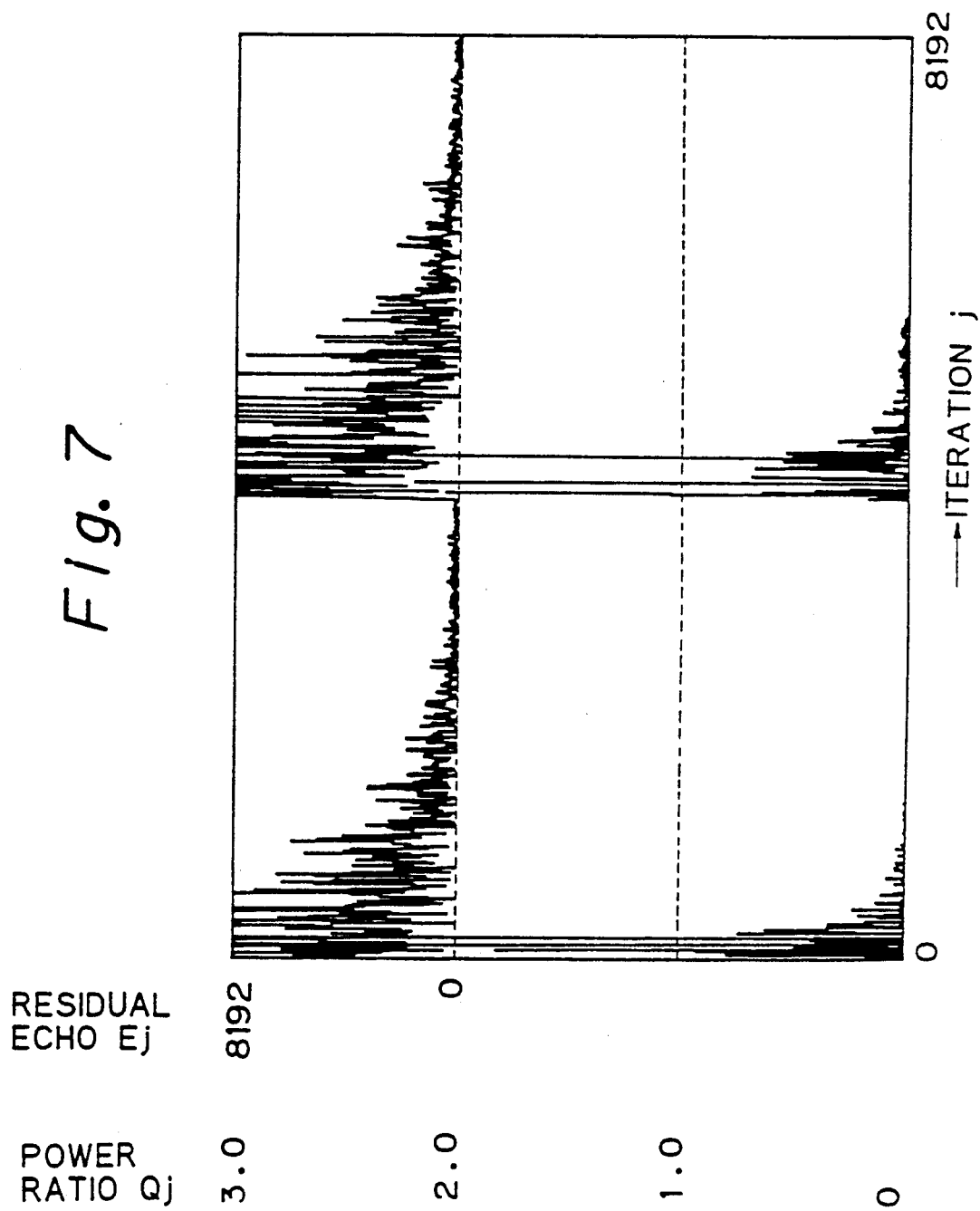
FIG. 7 shows the characteristics of the transition of an echo path by use of data integrated with respect to time.

Characteristics of the echo path transition by use of the data integrated with respect to time, in the case where the number of integrations is 8, are shown in FIG. 7.

Figure 8:
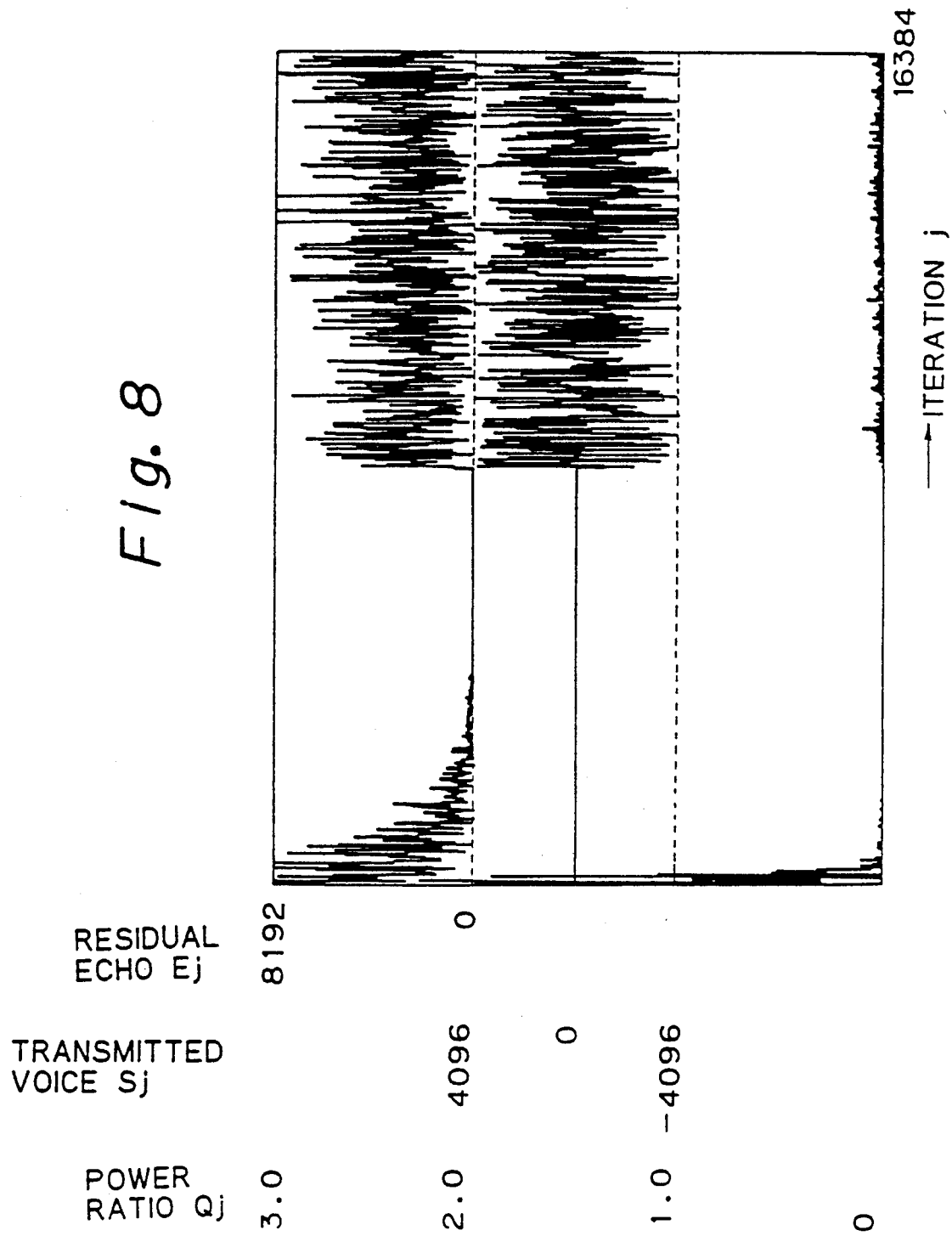
FIG. 8 shows the characteristics of the double talk by use of data integrated with respect to time.

Characteristics of the double talk by use of the data integrated with respect to time, in the case where the number of integrations is 16, are shown in FIG. 8.

Figure 9:
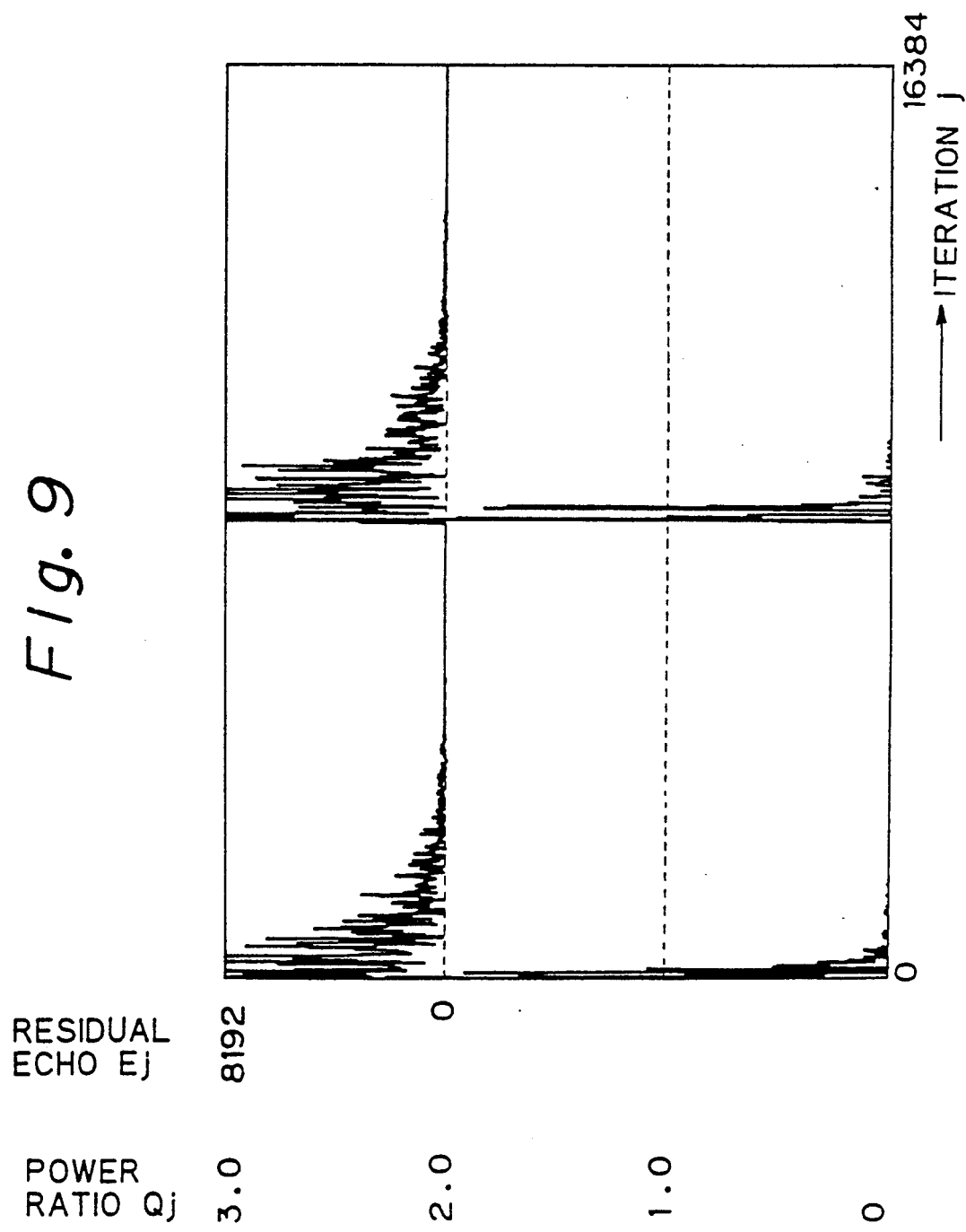
FIG. 9 shows the characteristics of the transition of an echo path by use of data integrated with respect to time.

Characteristics of the echo path transition by use of the data integrated with respect to time, in the case where the number of integrations is 16, are shown in FIG. 9. The reduction of the influence of the transmitted voice $S_j$ is observed in FIGS. 6 to 9.

Figure 10:
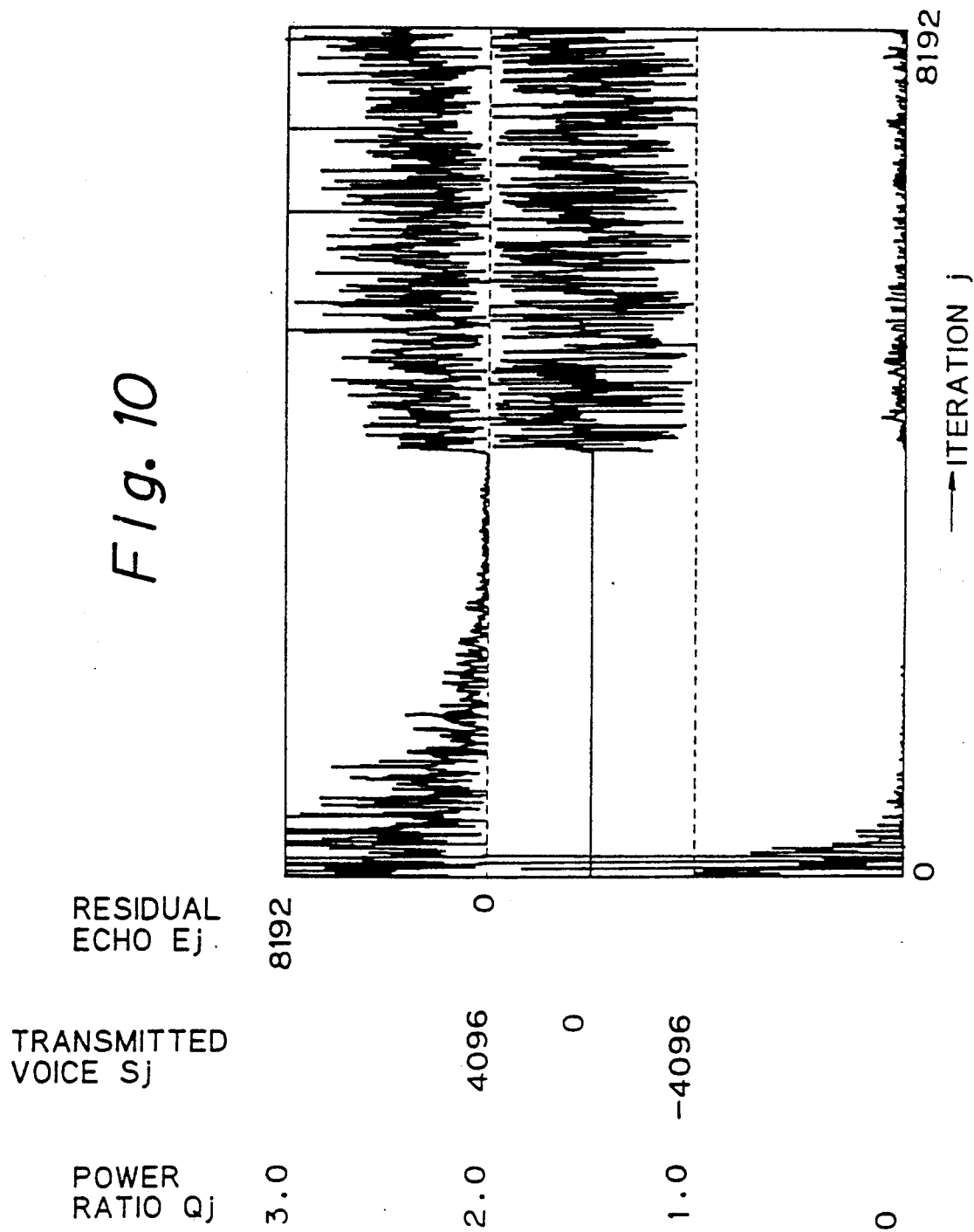
FIG. 10 shows the characteristics of the double talk by use of the condition $Pa \leq O$.

Characteristics of the double talk by use of the condition $Pa \leq 0$, i.e., the power Pa is equal to or less than 0, and $Q(8)_j = 1$, where the number of integrations is 8 are shown in FIG. 10.

Figure 11:
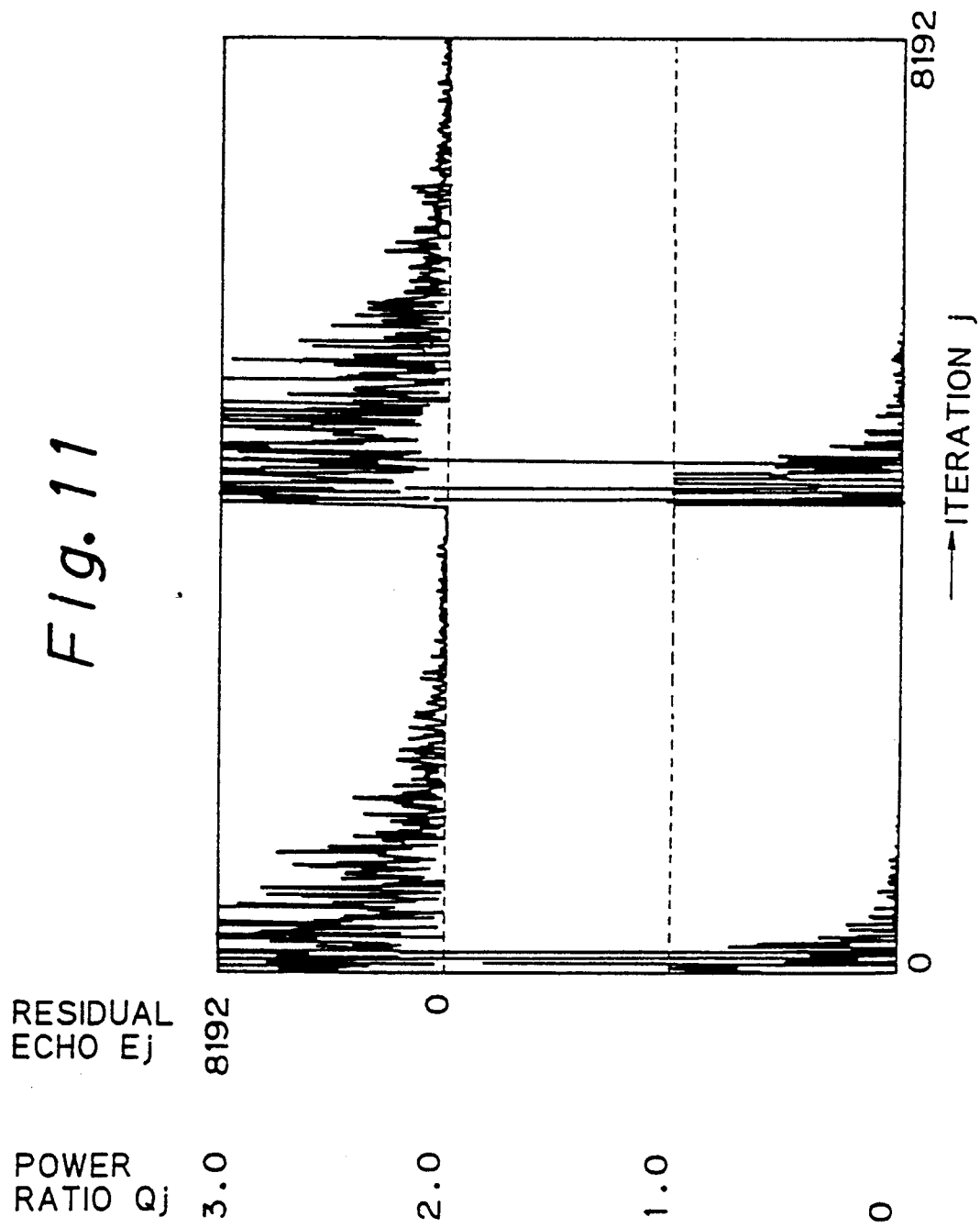
FIG. 11 shows the characteristics of the transition of an echo path by use of the condition $Pa \leq O$.

Characteristics of the echo path transition by use of the condition $Pa \leq 0$, i.e., the power Pa is equal to or less than 0, and $Q(8)_j = 1$, where the number of integrations is 8, are shown in FIG. 11. The decision of the echo path transition is carried out for each sampling period in FIGS. 6, 7, 10, and 11. The fact that the delay in the detection is only 8 sampling periods is observed in FIG. 11.

Figure 12:
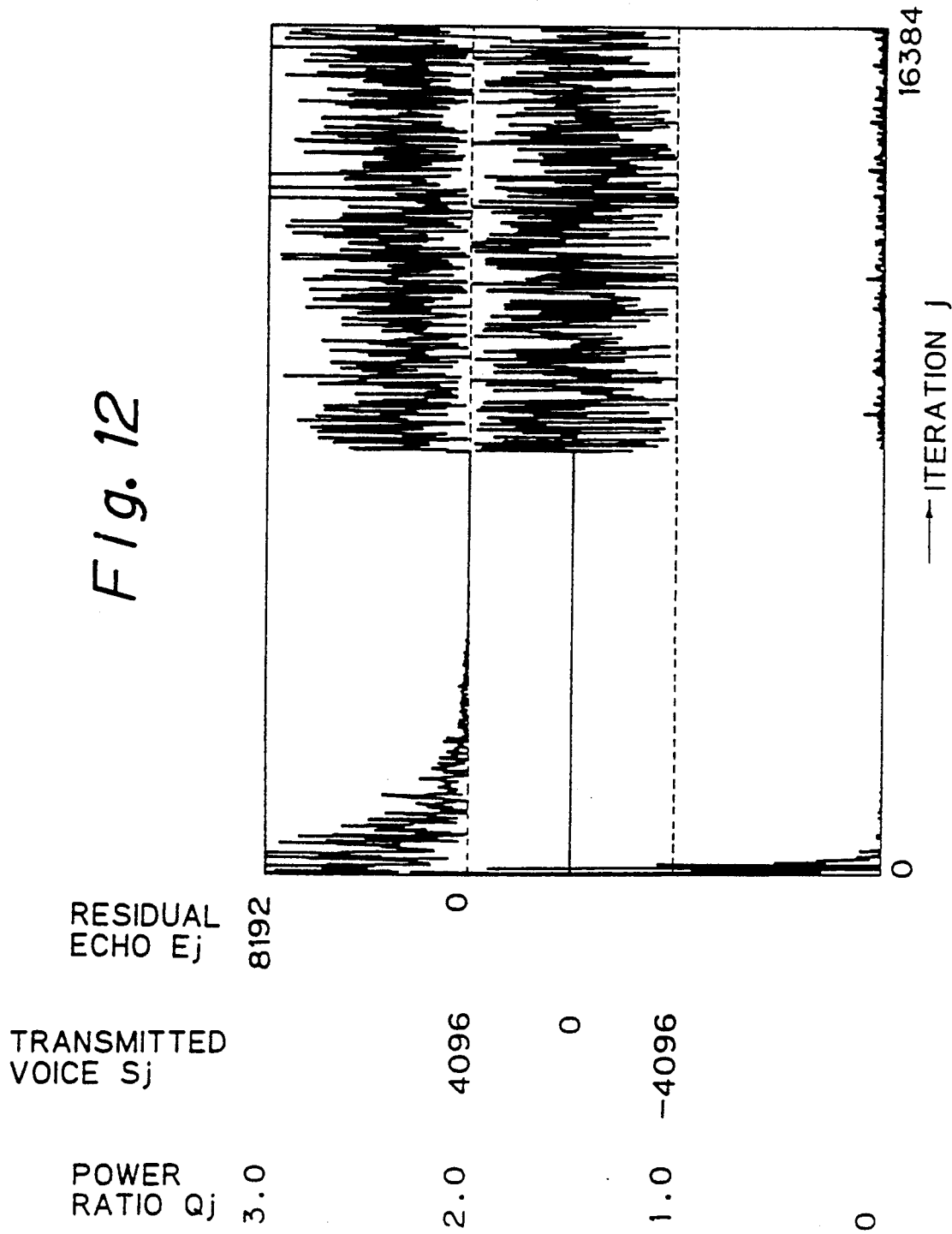
FIG. 12 shows the characteristics of the double talk by use of the condition $Pa \leq O$.

Characteristics of the double talk by use of the condition $Pa \leq 0$ and $Q(16)_j = 1$ for the case of FIG. 8, are shown in FIG. 12.

Figure 13:
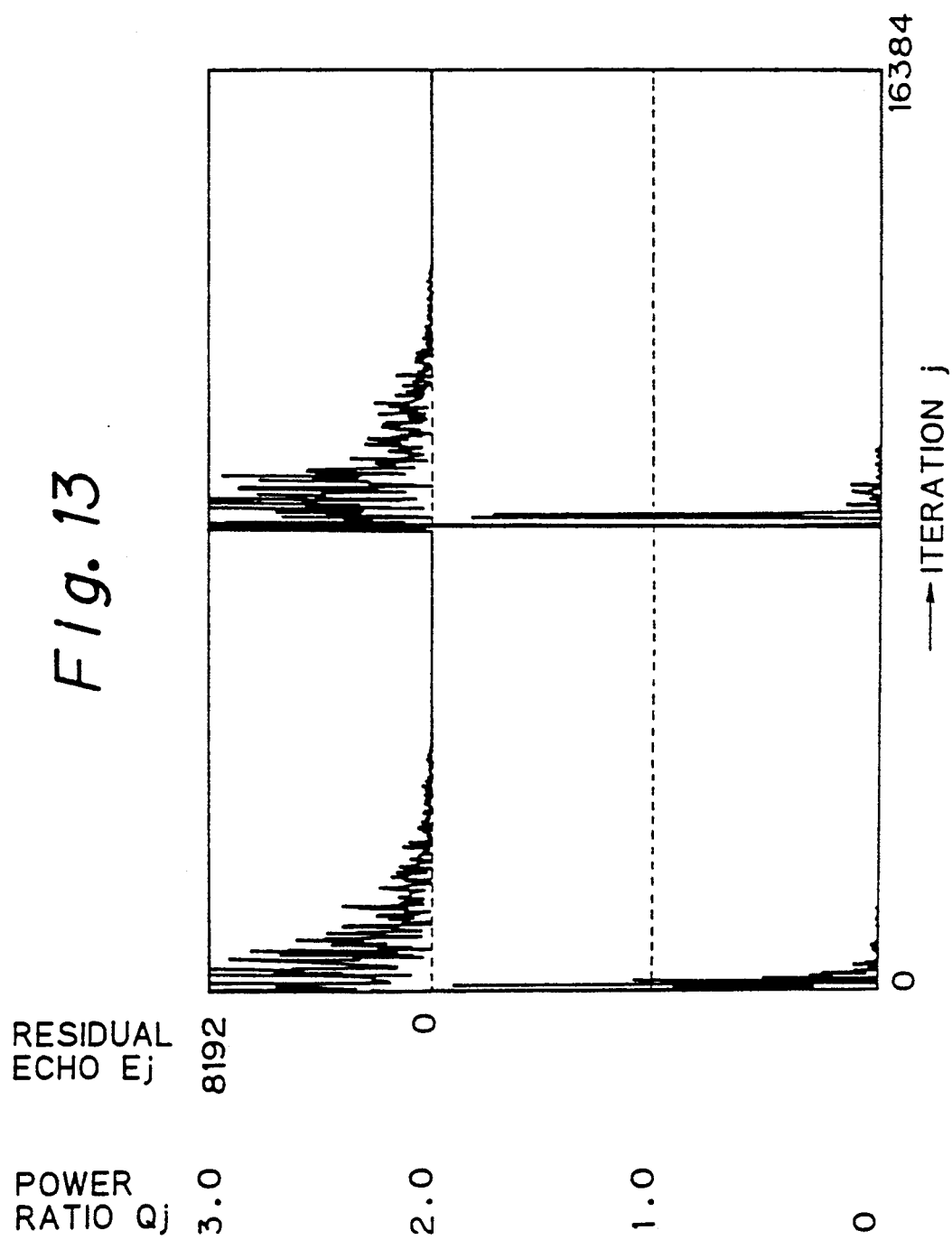
FIG. 13 shows the characteristics of the transition of an echo path by use of the condition $Pa \leq O$.

Characteristics of the echo path transition by use of the condition $Pa \leq 0$ and $Q(16)_j = 1$, for the case of FIG. 9, as shown in FIG. 13. The fact that the interval of the decisions of the echo path transition is increased as the number of integrations is extended and the effect of the increase of the speed of the detection due to the simultaneous use of the condition $Pa \leq 0$, are observed in FIGS. 12 and 13.

As a modification, in the apparatus shown in FIG. 2, it is possible not to use the cumulative summing circuits 42 and 44, and the dividers 51 and 52. In this case, the output of the integration portion 42 and the output of the integration portion 44 are led directly to the divider 7.

Figure 14:
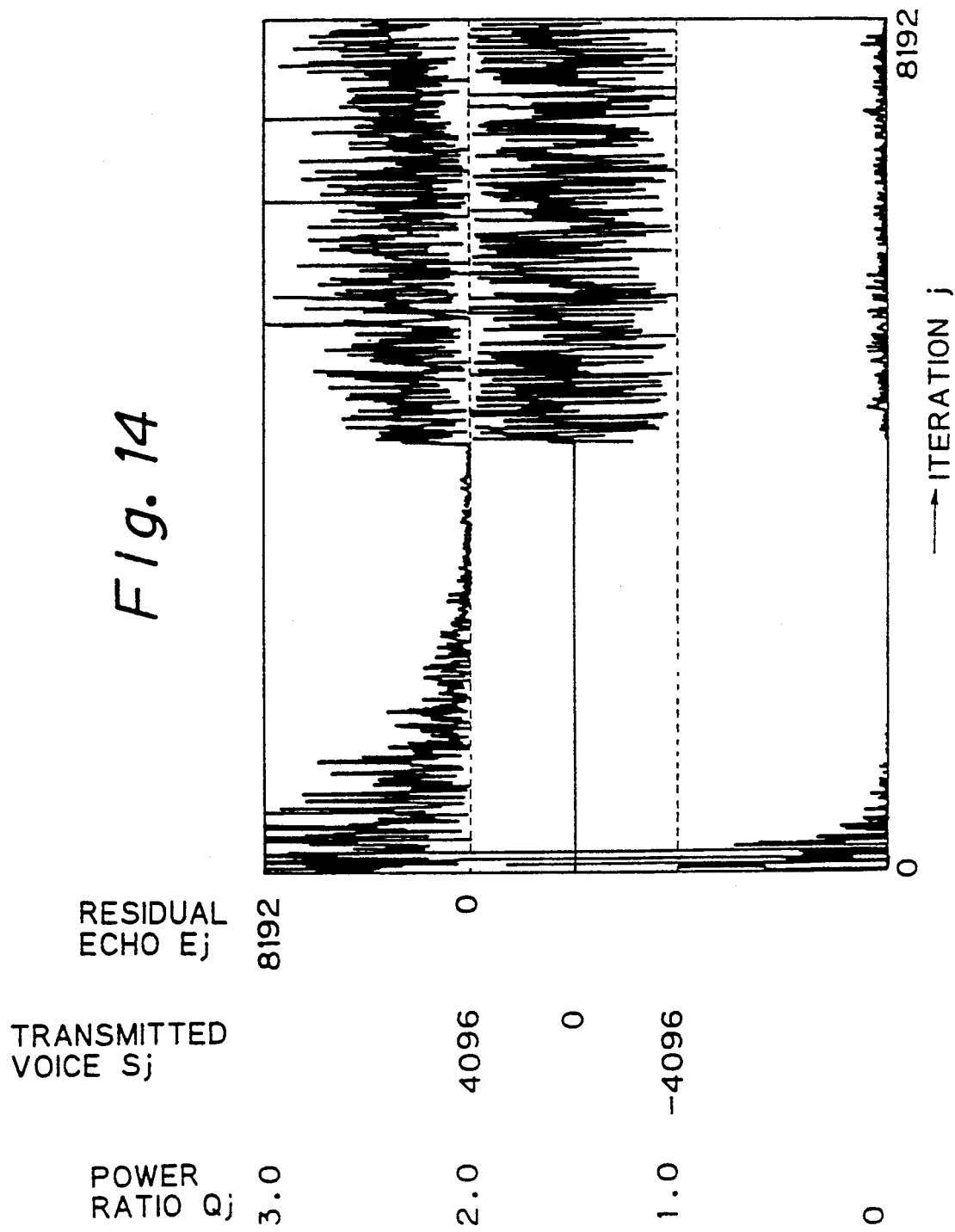
FIG. 14 shows the characteristics of the double talk by use of a simplified calculation.
Figure 15:
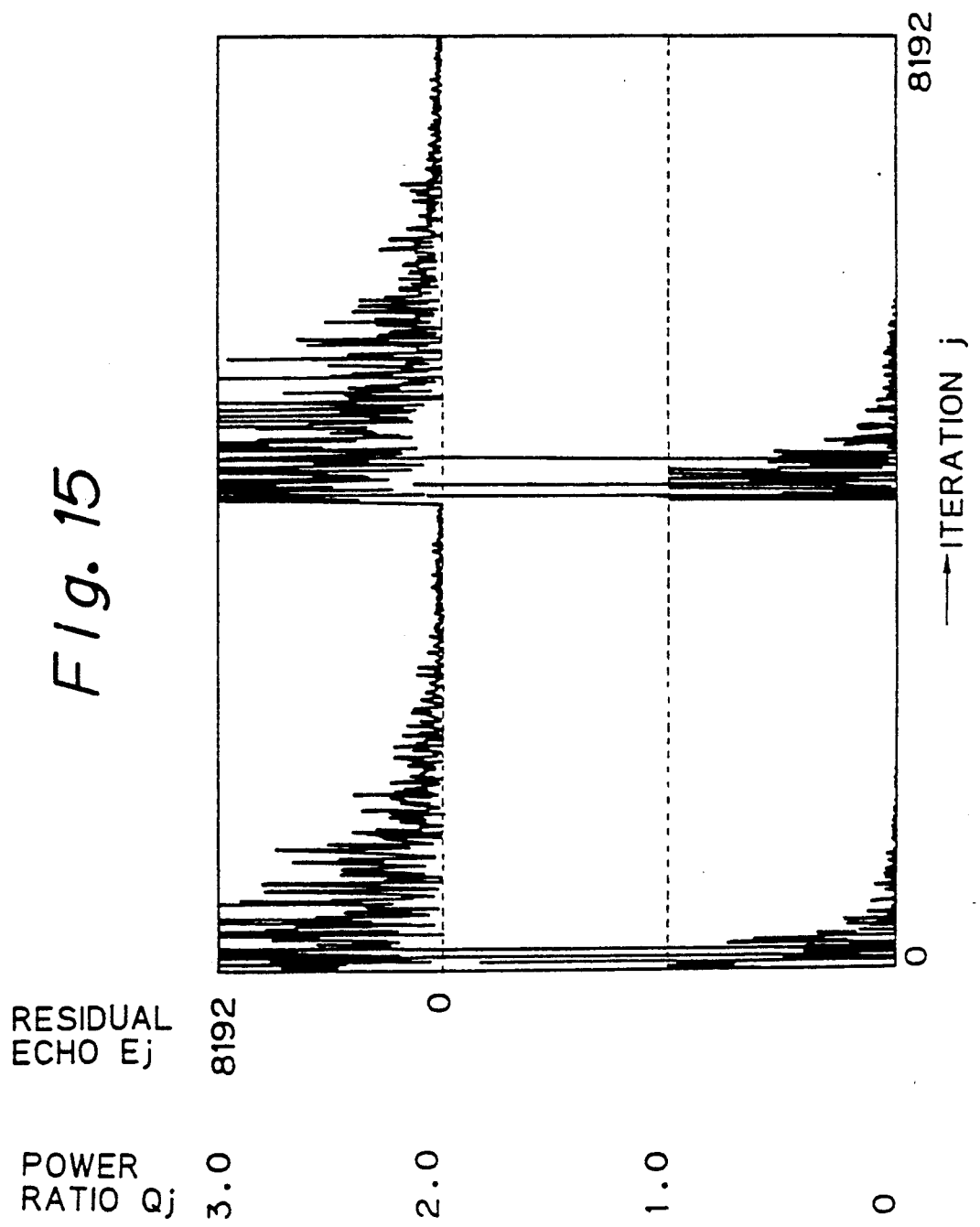
FIG. 15 shows the characteristics of the transition of an echo path by use of a simplified calculation.

Characteristics of the double talk by use of the simplified calculation for the apparatus of FIG. 2 are shown in FIG. 14. Characteristics of the transition of an echo path by use of the simplified calculation for the apparatus of FIG. 2 are shown in FIG. 15.

Figure 16B:
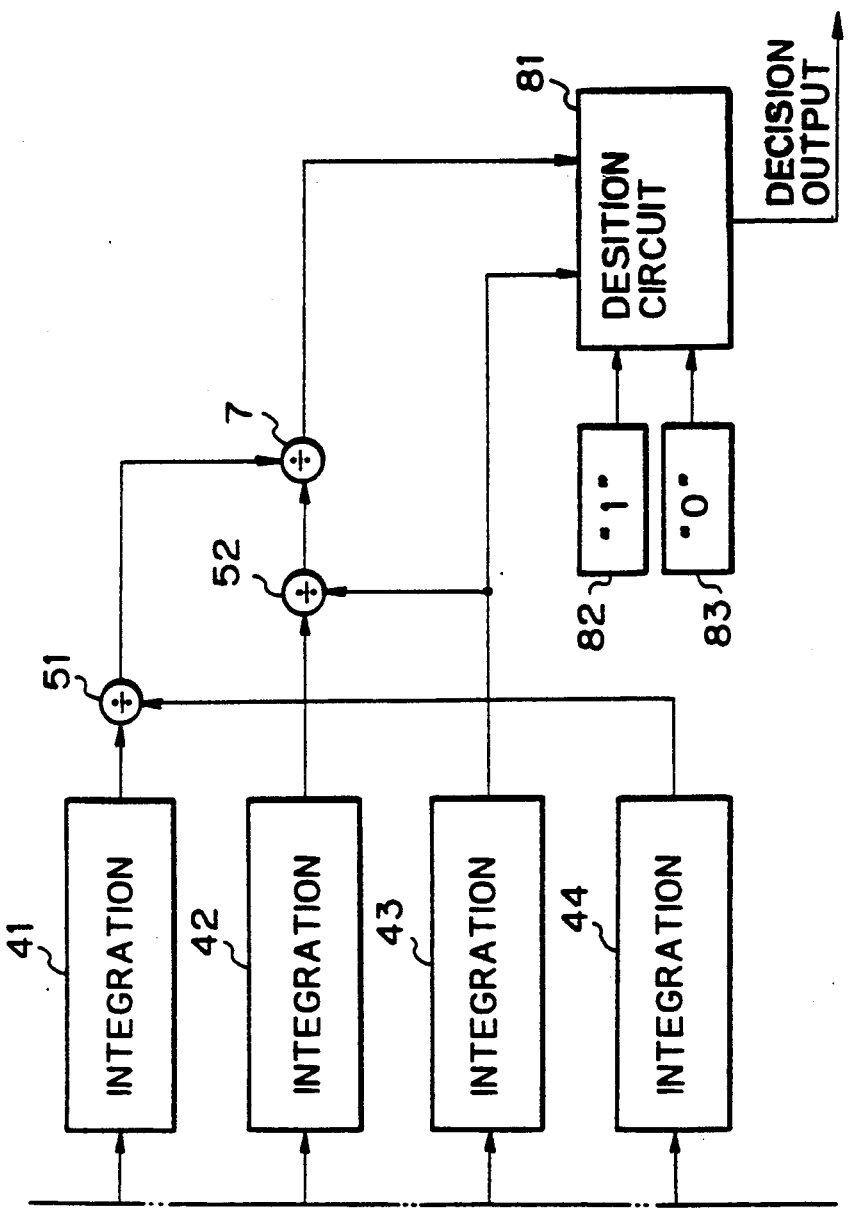

A schematic block diagram of an apparatus for detecting a transition of an echo path according to another embodiment of the present invention is shown in FIG. 16. The apparatus of FIG. 16 includes a signal ($Y_j$) input portion 11, an adaptive filter 12, a timing signal generating circuit 13, adders 21, 22, multipliers 23, 24, cumulative summation circuit 31, 32, 33, 34, integration portions 41, 42, 43, 44, dividers 51, 52, 7, a decision circuit 81, and reference signal inputs 82, 83. Basically, the structure of the apparatus of FIG. 16 is similar to that of FIG. 2.

In the cumulative summation circuit 31, the cumulative summation of the output $R_j(m)$ of the multiplier 23 for m=257 to 512 with respect to time is carried out to produce $\Sigma_n\Sigma_{(257\ to\ 512)}R_j(m)$. In the cumulative summation circuit 32, the cumulative summation of the output $X_j^2(m)$ of the multiplier 24 for m=257 to 512 with respect to time is carried out to produce $\Sigma_n\Sigma_{(257\ to\ 512)}X_j^2(m)$. In the cumulative summation circuit 33, the cumulative summation of the output $R_j(m)$ of the multiplier 23 for m 32 1 to 256 with respect to time is carried out to produce $\Sigma_n\Sigma_{(1\ to\ 256)}R_j(m)$. In the cumulative summation circuit 34, the cumulative summation of the output $X_j^2(m)$ of the multiplier 24 for m=1 to 256 with respect to time is carried out to produce $\Sigma_n\Sigma_{(1\ to\ 256)}X_j^2(m)$.

In the integration portions 41, 42, 43, and 44, the integrations of the outputs of the cumulative summation circuits 31, 32, 33, and 34 are carried out.

In the divider 51, the division between the output of the integration portion 41 and the output of the integration portion 44 is carried out to produce $\Sigma_n\Sigma_{(257\ to\ 512)}R_j(m)/\Sigma_n\Sigma_{(1\ to\ 256)}X_j^2(m)$. In the divider 52, the division between the output of the integration portion 42 and the output of the integration portion 43 is carried out to produce $\Sigma_n\Sigma_{(1\ to\ 256)}R_j(m)/\Sigma_n\Sigma_{(257\ to\ 512)}X_j^2(m)$.

In the divider 7, the division between the output of the divider 51 and the output of the divider 52 is carried out to produce $$Q_{nj} = \frac{\Sigma_n\Sigma_{(257\ to\ 512)}R_j(m)/\Sigma_n\Sigma_{(1\ to\ 256)}X_j^2(m)}{\Sigma_n\Sigma_{(1\ to\ 256)}R_j(m)/\Sigma_n\Sigma_{(257\ to\ 512)}X_j^2(m)} \quad (20)$$

In the decision circuit 81, the occurrence of echo path transition it is decided either if the output $Q_{nj}$ of the divider 7 is equal to or more than 1, or if the output $\Sigma_n\Sigma_{(1\ to\ 256)}R_j(m)$ of the integration portion 43 is equal to or less than 0. The result of the decision is delivered as the decision output.

As a modification, in the apparatus shown in FIG. 16, it is possible not to use the cumulative summing circuits 42 and 44, and the dividers 51 and 52. In this case, the output of the integration portion 41 and the output of the integration portion 43 are led directly to the divider 7.

Figure 17:
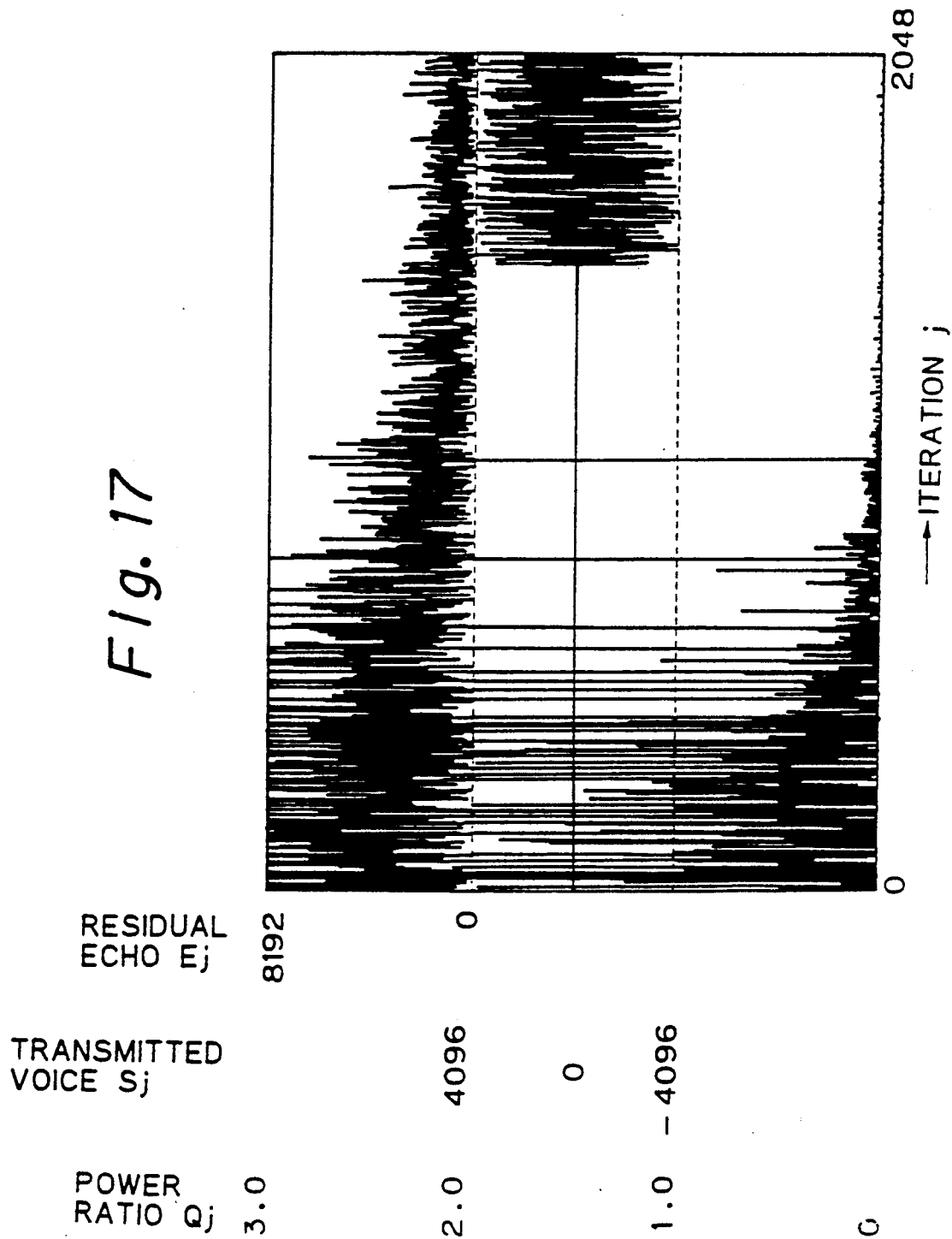
FIG. 17 shows the characteristics of the double talk by use of data integrated with respect to time.
Figure 18:
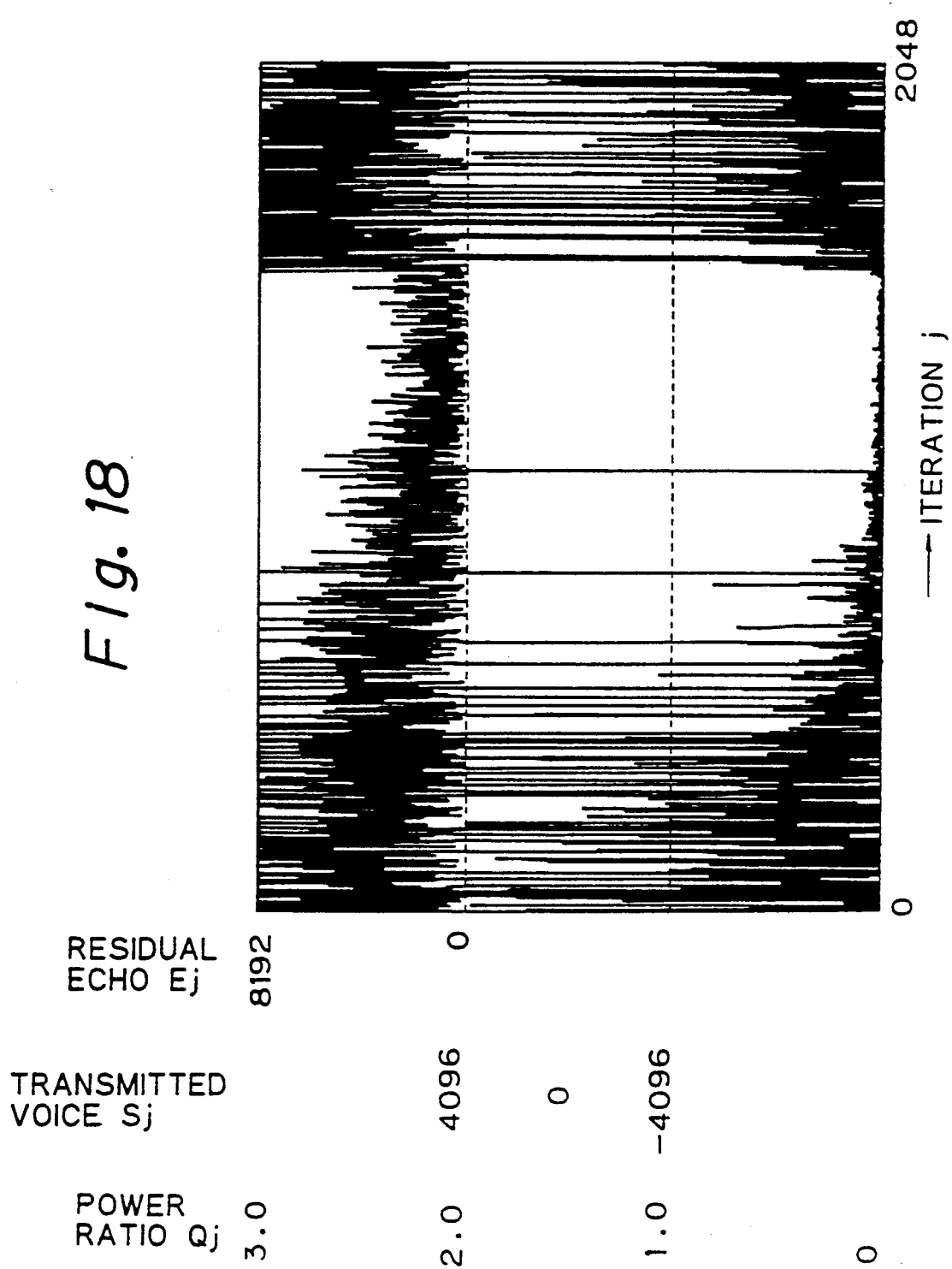
FIG. 18 shows the characteristics of the transition of an echo path without carrying out a decision concerning the power.

Characteristics of the double talk by use of the data integrated with respect to time for the apparatus of FIG. 16 are shown in FIG. 17. Characteristics of the transition of an echo path without carrying out the decision concerning the power for the apparatus of FIG. 16, are shown in FIG. 18.

The power ratio $Q_j$ is calculated as follows.

$$Q_j = \{\Sigma_{(257\ to\ 512)}R_j(m)/\Sigma_{(257\ to\ 512)}X_j^2(m)\}/\{\Sigma_{(1\ to\ 256)}R_j(m)/\Sigma_{(1\ to\ 256)}X_j^2(m)\} \quad (21)$$

We claim:
1. A method of detecting a transition of an echo path to estimate a transfer function of a communication system, said method comprising the steps of:
 (a) transmitting a signal through the communication system to obtain an echo signal;
 (b) receiving the echo signal from the communication system,
 (c) determining a first amount as a whole of the echo signal or a former portion of the echo signal,
 (d) determining a second amount as a latter portion of the echo signal,
 (e) determining a ratio between the first amount of the whole or the former portion of the echo signal and the second amount of the latter portion of the echo signal, and
 (f) identifying a transition of the echo path of the communication system based on the ratio so that the transition is discriminated from a disturbance signal produced by the communication system.

2. A method according to claim 1, wherein said method further comprises the step of (g) integrating the ratio with respect to time to produce an integrated ratio, and
 wherein the step (f) further comprises the step of (f1) outputting a signal indicating a transition of the echo path of the communication system based on the integrated ratio.

3. A method according to claim 1, wherein said step (f) further comprises the substep of (f1) outputting a signal indicating a transition of the echo path of the communication system based on the ratio when the first amount is negative or zero.

4. A method according to claim 1,
 wherein said method further comprises the steps of:
 (g) receiving an echo replica from an adaptive filter;
 (h) determining a residual echo as a difference between the echo signal and at least the echo replica, and
 (i) determining a product of the echo replica and at least the residual echo,
 wherein said step (c) comprises the substep of (c1) determining the first amount as the whole or a former portion of the product,
 wherein said step (d) comprises substep of (d1) determining the second amount as a latter portion of the product, and
 wherein said step (e) comprises the substep of (e1) determining the ratio based on the first and second amounts and power information concerning the echo signal.

5. A method according to claim 4, wherein said step (e1) further comprises the substeps of
 (e1i) determining a first integration with respect to time of the first amount,
 (e1ii) determining a second integration with respect to time of a whole or a former portion of the power information,
 (e1iii) determining a third integration with respect to time of the second amount,
 (e1iv) determining a fourth integration with respect to time of a latter portion of the power information, and (e1v) determining the ratio as a ratio of the product of the first and second integrations and a product of the third and fourth integrations.

6. An apparatus for detecting a transition of an echo path to estimate a transfer function of a communication system based on an echo signal from the communication system, said apparatus comprising:

first amount determining means for determining a first amount as a whole or a former portion of the echo signal, second amount determining means for determining a second amount as a latter portion of the echo signal, ratio determining means for determining a ratio between the first amount of the whole or the former portion of the echo signal and the second amount of the latter portion of the echo signal, and identifying means for identifying a transition of the echo path of the communication system based on the ratio so that the transition is discriminated from a disturbance signal produced by the communication system.

7. An apparatus according to claim 6, wherein said apparatus further comprises integration means for integrating the ratio with respect to time to produce an integrated ratio, and wherein said identifying means comprises means for identifying a transition of the echo path of the communication system based on the integrated ratio.

8. An apparatus according to claim 6, wherein said identifying means comprises means for identifying a transition of the echo path of the communication system based on the ratio when the first amount is negative or zero.

9. An apparatus according to claim 6, wherein said apparatus further comprises an adaptive filter for providing an echo replica, a residual echo determining means for determining a residual echo as a difference between the echo signal and at least the echo replica, and a multiplying means for determining a product of the echo replica and at least the residual echo, wherein said first amount determining means comprises means for determining the first amount as a whole or a former portion of the product, and wherein said second amount determining means comprises means for determining the second amount as a latter portion of the product.

10. An apparatus according to claim 9, wherein said ratio determining means further comprises:

first integration determining means for determining a first integration with respect to time of the first amount, second integration determining means for determining a second integration with respect to time of a whole or a former portion of power information concerning the echo signal, third integration determining means for determining a third integration with respect to time of the second amount, fourth integration determining means for determining a fourth integration with respect to time of a remaining delayed portion of the power information, and product ratio determining means for determining the ratio as a ratio of a product of the first and second integrations and a product of the third and fourth integrations.

* * * * *